US006263614B1

(12) United States Patent
Koo

(10) Patent No.: US 6,263,614 B1
(45) Date of Patent: Jul. 24, 2001

(54) BASE FOR SUPPORTING ARTIFICAL FLOWERS OR FOLIAGE

(75) Inventor: Yue Sin George Koo, Kowloon (HK)

(73) Assignee: United Chinese Plastics Products Co., Ltd., Kowloon (HK)

( * ) Notice: Subject to any disclaimer, the term of this patent is extended or adjusted under 35 U.S.C. 154(b) by 0 days.

(21) Appl. No.: 09/113,693

(22) Filed: Jul. 10, 1998

(51) Int. Cl.⁷ .................................................. A01G 5/00
(52) U.S. Cl. ........................................ 47/41.14; 47/41.13
(58) Field of Search ............................... 47/41.01, 41.11, 47/41.13, 41.14, 41.1; 248/530, 27.4; 428/19, 23; D6/403

(56) References Cited

U.S. PATENT DOCUMENTS

| | | | |
|---|---|---|---|
| D. 215,320 | * 9/1969 | Klayman | 47/44 |
| 649,874 | * 5/1900 | Payne | 47/41.11 |
| 742,871 | * 11/1903 | Hummel | 428/19 |
| 1,562,992 | * 4/1925 | Schling | 47/41.11 |
| 2,836,933 | * 6/1958 | Klein | 47/41.11 |
| 2,851,807 | * 9/1958 | Taylor | 428/19 |
| 2,908,112 | * 10/1959 | Koistinen | 47/41.11 X |
| 3,085,774 | * 4/1963 | Di Ienno | 428/19 |
| 4,588,157 | * 5/1986 | Mills | 248/530 X |
| 5,279,072 | * 1/1994 | Garbo | 47/41.14 |
| 5,375,370 | * 12/1994 | Zimmerman | 47/41.01 |
| 6,004,635 | * 12/1999 | Li | 47/41.12 X |

FOREIGN PATENT DOCUMENTS

470621  *  8/1937  (GB) .................................. 47/41.13

* cited by examiner

Primary Examiner—Peter M. Poon
Assistant Examiner—Son T. Nguyen
(74) Attorney, Agent, or Firm—Cohen, Pontani, Lieberman & Pavane

(57) ABSTRACT

A base (2) for supporting artificial flowers or foliage comprises a spike (4) and one or more stem-supporting members (6, 8, 10) securable on the spike (4) by means of a securing member (12) which engages with the spike (4), the stem-supporting members (6, 8, 10) having a plurality of apertures for receiving stem ends of the flowers or foliage.

19 Claims, 5 Drawing Sheets

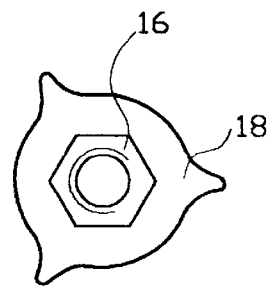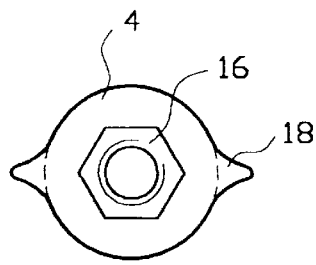
FIG.7(b)         FIG.6(b)
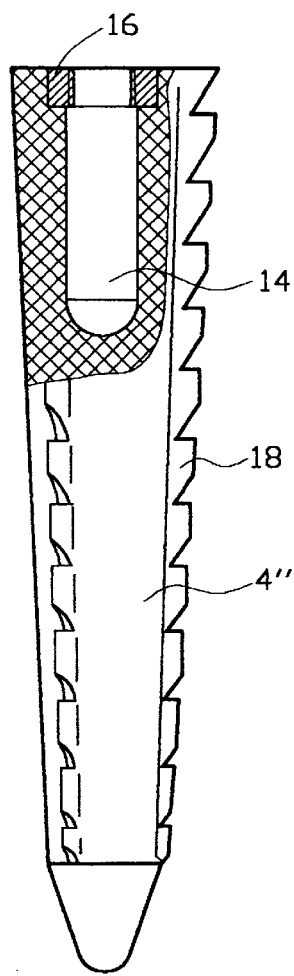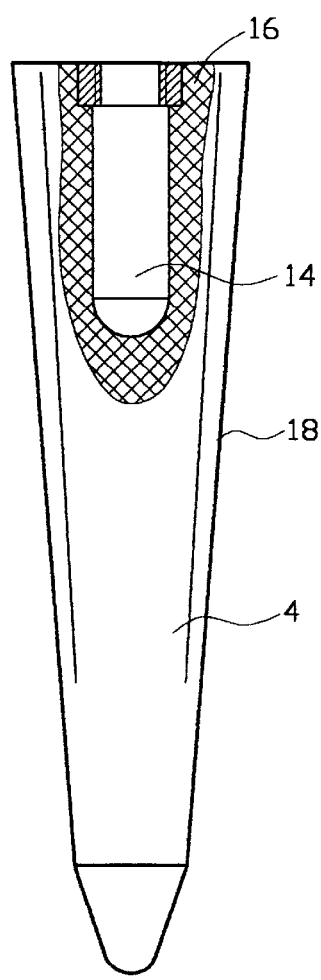
FIG.7(a)         FIG.6(a)

US 6,263,614 B1

BASE FOR SUPPORTING ARTIFICAL FLOWERS OR FOLIAGE

BACKGROUND OF THE INVENTION

The present invention relates to a base for supporting bunches of artificial flowers or foliage.

It is previously known to provide a base for supporting artificial flower and/or foliage arrangements which comprises a disc having a plurality of holes into which lower ends of stems of the flowers or foliage can be fitted. Such an arrangement, whilst adequately supporting that particular flower and/or foliage arrangement, is inflexible in that it cannot be used with a larger arrangement, or if it is desired to use a smaller arrangement, leaves regions of the base devoid of flowers or foliage which is thereby unsightly.

The present invention seeks to provide a structure which can accommodate a variety of different flower and/or foliage arrangements.

SUMMARY OF THE INVENTION

According to the present invention there is provided a base for supporting artificial flowers or foliage comprising a spike for pushing into a supporting medium, and at least one stem-supporting member securable on said spike defining a plurality of stem-receiving apertures therein.

This allows one or more stem-supporting members to be selected and secured on to the spike as desired.

In the preferred embodiment a separate securing member is provided in order to releasably secure the or each stem-supporting member on the spike. This may comprise an enlarged upper body part and an elongate threaded rod, with the spike defining a threaded opening in which the threaded rod is received, and the or each stem-supporting member defining an aperture through which the threaded rod extends.

The stem-supporting members define the stem-receiving apertures at or near an outer periphery thereof. The apertures may be of at least two different sizes in order to accommodate different sizes of stems. The supporting member may have a variety of outer profile shapes including an undulating or wavy profile.

Where more than one stem-supporting member is provided these are preferably arranged on top of each other in order of upwardly-decreasing diameter. The stem-supporting members may each define a central recessed region in which the adjacent stem-supporting member of smaller diameter is able to sit. This ensures that the stem-supporting members fit tightly and snugly together.

The securing member may also define a plurality of apertures for receiving stems of artificial flowers or foliage.

The spike preferably tapers to a point towards its lower end and is provided with at least to longitudinally-extending ribs which may also be provided with a plurality of serrations along their length.

In one embodiment the upper body part of the securing member may be formed integrally with a lower portion of one or more stems of the artificial flower or foliage.

In a further aspect, the invention resides in a bunch of artificial flowers or a foliage bush in combination with a base as defined above. The bunch of flowers or foliage bush has stems, lower ends of which are pushed into the stem-receiving apertures in the supporting members and may be secured therein by means of an adhesive.

In a further aspect, the invention comprises a base for supporting artificial flowers or foliage comprising a spike for pushing into a supporting medium, at least one stem-supporting member selected from a group of supporting members of different size defining a plurality of stem-receiving apertures therein and securing means for securing the or each stem-supporting member on said spike.

BRIEF DESCRIPTION OF THE DRAWINGS

Embodiments of the invention are now described, by way of example only, with reference to the following drawings in which:

FIG. 6(a) is part cross-sectional and part side view of a spike of the base;

FIG. 6(b) is a view from above of the spike of FIG. 6(a);

FIG. 7(a) is a part cross-sectional and part side view of an alternative spike;

FIG. 7(b) is a view from above of the spike of FIG. 7(a);

DETAILED DESCRIPTION OF THE PREFERRED EMBODIMENTS

Turning to the Figures, FIGS. 1 to 5 illustrate in assembled conditions four different embodiments of a base for supporting artificial flowers or foliage, indicated generally by numeral 2.

Figure 1:
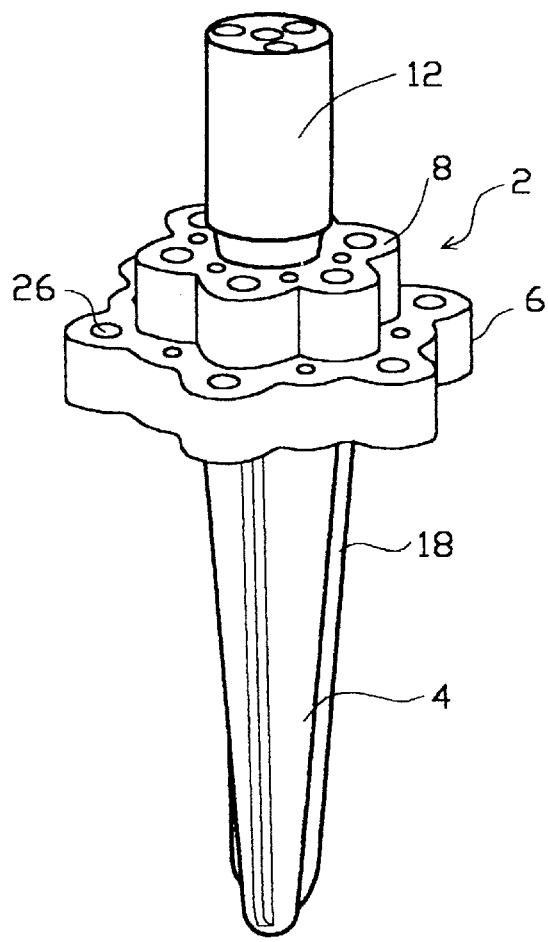
FIG. 1 is a perspective view of a base for supporting artificial flowers or foliage in accordance with a first embodiment of the invention.

The first embodiment illustrated in FIG. 1 includes a spike 4 which in use is pushed into a supporting medium such as a pot of soil, artificial soil or other deformable medium, two stem-supporting members indicated 6 and 8, and a securing member 12 which serves to secure the stem-supporting members 6, 8 on the spike 4.

Figure 2:
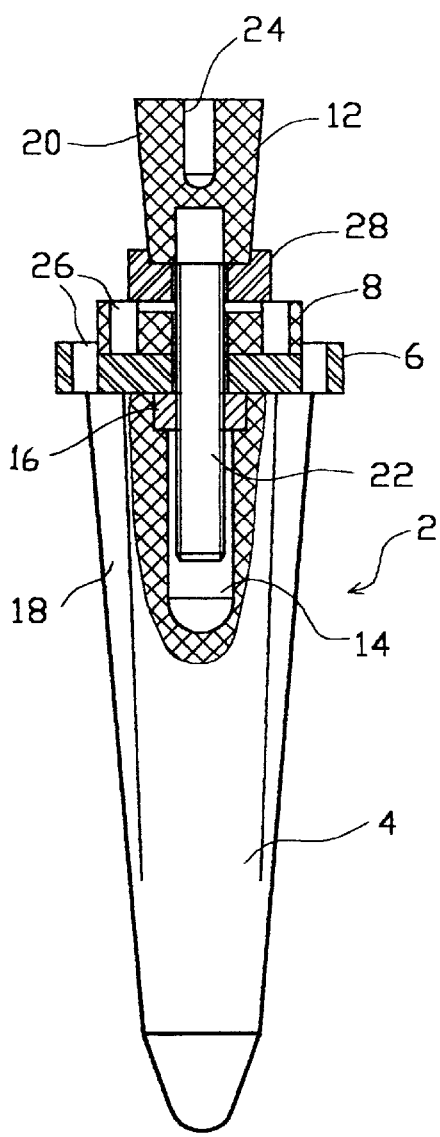
FIG. 2 is a part cross-sectional and part side view of a base according to a second embodiment of the invention.

The spike 4 has an elongate form which tapers to a point at its lower end. As can be seen in FIG. 2, the spike is provided at its upper end with an axial bore 14 and a threaded nut 16 fixed in the bore of the spike 4. Alternatively, a threaded sleeve may be provided in the bore 14. The spike is provided along its length with a number of longitudinally extending ribs 18, as more clearly seen in FIGS. 6(a) and (b) and FIGS. 7(a) and (b). These ribs serve to aid in the anchoring of the spike as the base is pushed into a pot of soil, artificial soil, or other receiving medium. The spike is preferably formed of an injection-moulded plastics material with the exception of the nut 16 which is preferably formed of metal for durability.

As illustrated in FIG. 2 the securing member 12 comprises a generally cylindrical or slightly frustoconical body 20 from which depends a threaded shank 22 of narrower diameter which is permanently fixed thereto. The upper end of the body 20 is preferably provided with one or more openings 24 for receiving the ends of flowers or foliage stems.

Figure 8B:
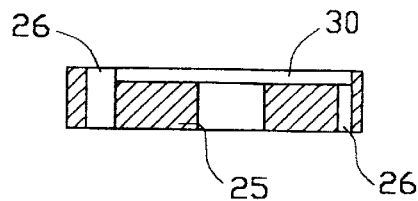
FIG. 8(b) is a cross-sectional view along the line A—A of FIG. 8(a)
Figure 8A:
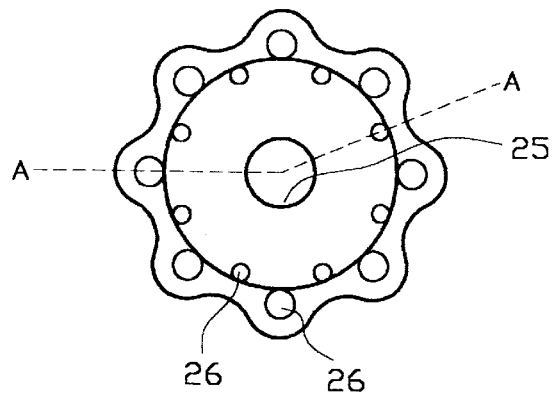
FIG. 8(a) is a view from above of a first stem-supporting member.
Figure 9A:
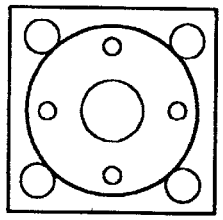
FIGS. 9(a) to (d) illustrate alternative designs of stem-supporting member.
Figure 9B:
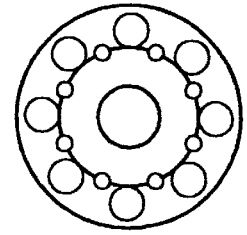
Figure 9C:
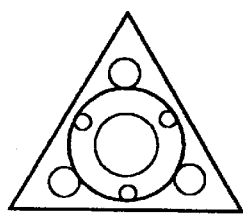
Figure 9D:
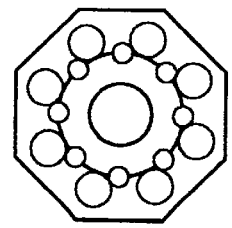

The stem-supporting members 6, 8 comprise generally disc-shaped members which are provided with a number of stem-receiving apertures 26 distributed around the member, generally around the peripheral region. As best seen in FIG. 8(a) the apertures 26 may have different sizes to accommodate different sizes of stems. The centre of the members 6, 8 is provided with an axial bore 25 through which the threaded rod 22 extends. As indicated in FIG. 2, as well as the stem-supporting members 6, 8 there is also provided a spacer 28 also provided with the central bore which is devoid of any stem-supporting apertures. This spacer is absent from the other embodiments. The spacer 28 can serve to ensure that member the threaded rod 22 does not reach the bottom of the bore 14 in the spike. The stem-supporting members 6, 8 are each provided with a recessed central region 30, best seen in FIG. 8(b). It is preferably arranged that the upper member 8 is of smaller diameter than the adjacent lower member 6 so that 8 sits snugly in the recess 30 of the member 6. This helps the members 6, 8 to fit tightly against each other.

Figure 4:
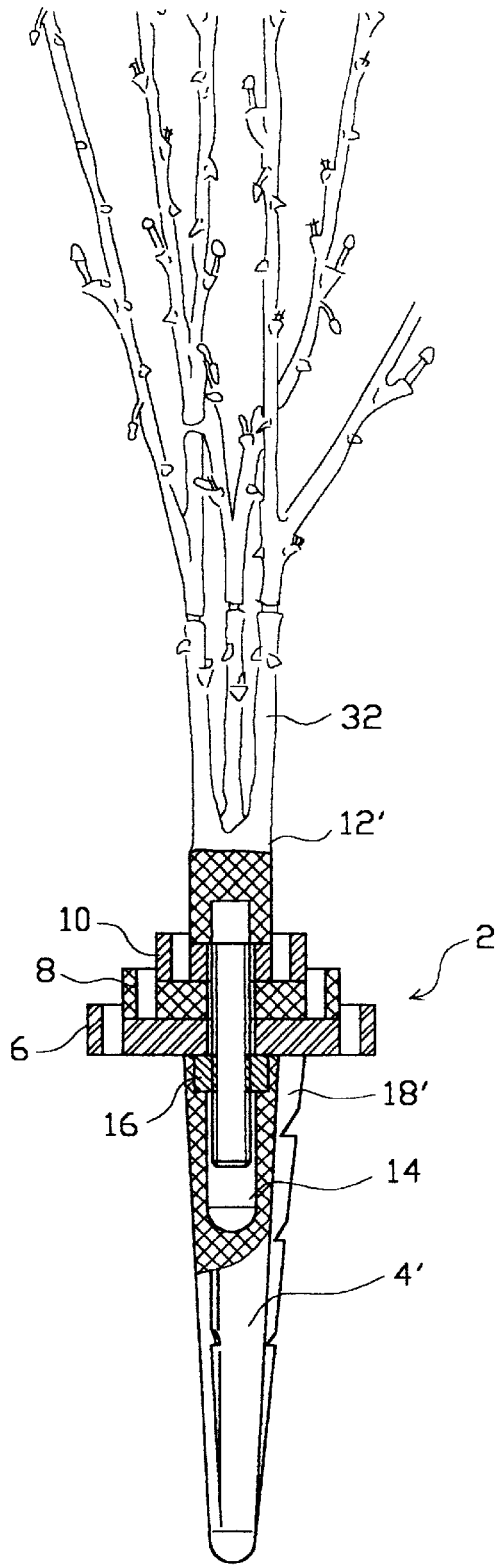
FIG. 4 is a part cross-sectional and part side view of a base according to a third embodiment of the invention.

Turning to the embodiment of the invention illustrated in FIG. 4, in contrast to the embodiments of FIGS. 1 and 2 the spike 4' includes ribs 18' which are provided with serrations. These assist in allowing the spike to grip into the receiving medium. As well as first and second stem-supporting members 6, 8, a third such member 10 is also provided, these members 6, 8, 10 being stacked one on the other in order of upwardly reducing diameter. Although three such members are shown, a larger number of such members may be provided. The securing member 12' is in this embodiment is formed unitarily with lower regions of foliage stems indicated 32.

Figure 5:
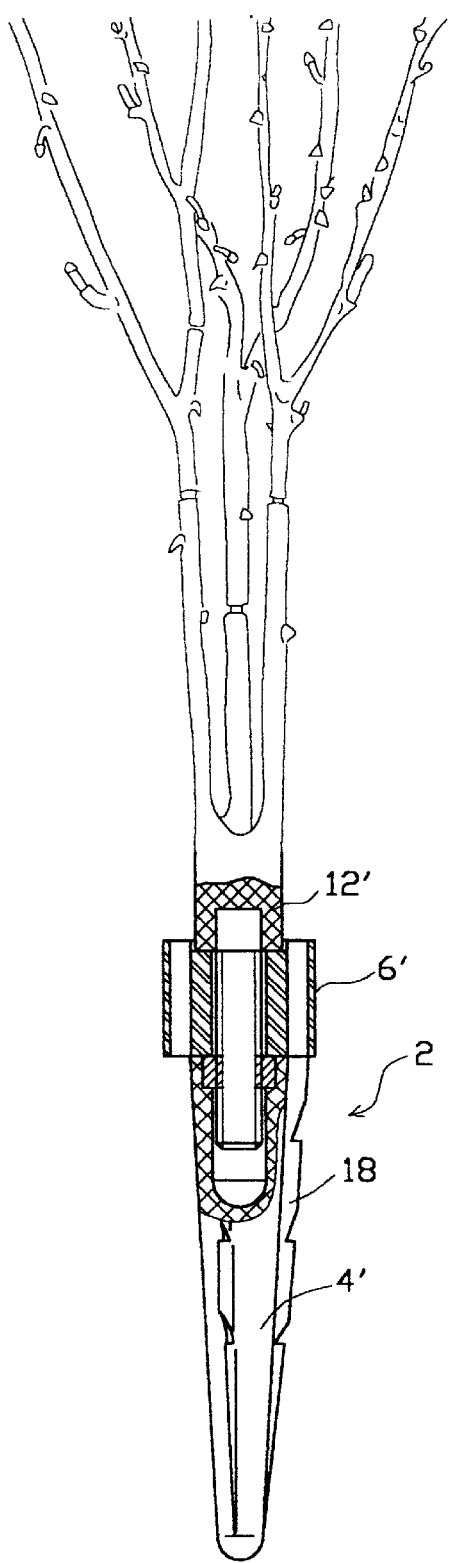
FIG. 5 is a part cross-sectional and part side view of a base according to a fourth embodiment of the invention.

In the embodiment illustrated in FIG. 5 a spike 4' is utilized which is identical to that used in the embodiment of FIG. 4, whilst the securing part 12' is also identical to that used in the embodiment of FIG. 4. Here, only a single stem-supporting member 6' which is relatively thick compared to the members 6, 8, 10 of FIG. 4 is provided.

The stem-supporting members 6, 8 and 10 may take a variety of forms such as the generally circular form with the wavy outer profile as illustrated in FIG. 8(a) or other such forms as illustrated in FIGS. 9(a) to (d).

Figure 3:
FIG. 3 is a view of the base of FIG. 1 with the artificial foliage and flowers (illustrated in outline) fitted to base.

In use, a number of appropriately dimensioned stem-supporting members 6, 8, 10 are fitted together on top of the spike 4 or 4" with a securing part 12 or 12" inserted so that the threaded rod 22 thereof extends through the supporting members 6, 8, 10 and is screwed into the spike 4'. The ends of the stems of the artificial flowers and/or foliage are then inserted into the openings 26, as shown in FIG. 3. In the case of stems which are in the form of bendable wire portions these may be inserted through the openings 26 and bent under the openings. An adhesive may also be used to secure the stems into the openings 26. If desired, the members 6, 8, 10 may also be covered in an artificial moss-like material in order to give a more natural appearance.

Although the various embodiments described and illustrated use a securing member 12 which has a threaded rod 22 engaging into a bore in the spike 4, the spike 4 could instead be fitted with the threaded rod and the securing member provided with a threaded bore.

As a further alternative, an arrangement of supporting members 6, 8, 10 which snap-fit on to the spike could be provided.

The base as described above forms a modular arrangement allowing a variety of different flower and/or foliage arrangements to be provided on the single spike, depending on the selection of components.

I claim:

1. A base for supporting artificial flowers or foliage comprising only one spike pushable into a supporting medium for sole support of the base in the supporting medium, at least one stem-supporting member releasably securable on said spike and defining a plurality of stem-receiving apertures therein, a securing member releasably securing the or each stem-supporting member releasably on the spike, an enlarged upper body part and an elongate threaded rod, wherein the spike defines a threaded opening in which the threaded rod is received and the or each stem-supporting member defines an aperture through which the threaded rod extends.

2. A base according to claim 1, wherein the or each stem-supporting member defines said stem-receiving apertures at or near an outer periphery thereof.

3. A base according to claim 1, wherein the or each stem-supporting member defines stem-receiving apertures of at least two different sizes therein.

4. A base according to claim 1, wherein the or each stem-supporting member has an outer circumference of undulating profile.

5. A base according to claim 1 wherein the spike tapers to a point towards its lower end and is provided with at least two longitudinally-extending narrow ribs.

6. A base according to claim 5 wherein the ribs are provided with a plurality of serrations along their length.

7. A base according to claim 1 wherein the upper body part of the securing member is formed integrally with a lower portion of one or more stems of an artificial flower or artificial foliage.

8. A bunch of artificial flowers in combination with a base according to claim 1.

9. A bunch of artificial flowers according to claim 8, wherein the bunch of flowers has stems, lower ends of which are pushed into said apertures in the stem-supporting member and secured by means of an adhesive.

10. An artificial foliage bush in combination with a base according to claim 1.

11. A base for supporting artificial flowers or foliage comprising only one spike pushable into a supporting medium for sole support of the base in the supporting medium, a plurality of stem-supporting members arranged on top of each other in order of upwardly decreasing diameter releasably securable on said spike and defining a plurality of stem-receiving apertures therein, and a securing member releasably securing the or each stem-supporting member releasably on the spike.

12. A base according to claim 11, wherein the stem-supporting members each define a central recessed region in which the adjacent supporting member of smaller diameter is able to sit.

13. A base for supporting artificial flowers or foliage, comprising:

only one spike pushable into a supporting medium for sole support of the base in the supporting medium:

at least one stem-supporting member selected from a group of stem-supporting members of different size and defining a plurality of stem-receiving apertures therein; and securing means for securing the or each stem-supporting member on said spike, wherein the securing means comprises a securing member releasably engagable with the spike to secure the or each stem-supporting member, wherein the securing member comprises an enlarged upper body part and an elongate threaded rod and wherein the spike defines a threaded opening in which the threaded rod is received, and wherein the or each supporting member defines an aperture through which the threaded rod extends.

14. A base for supporting artificial flowers or foliage comprising a spike for pushing into a supporting medium, and a plurality of stem-supporting members securable on the spike, each defining a plurality of stem receiving apertures therein, the plurality of stem-supporting members arranged on top of each other in order of upwardly-decreasing diameter.

15. A base according to claim 14 wherein the stem-supporting members each define a central recessed region in which the adjacent supporting member of smaller diameter is able to sit.

16. A base for supporting artificial flowers or foliage, comprising only one spike for pushing into a supporting medium for sole support of the base in the supporting medium, at least one stem-supporting member securable on the spike and defining a plurality of stem-receiving apertures therein, and a securing member to releasably secure the or each stem-supporting member on the spike which also defines a plurality of apertures for receiving stems of artificial flowers or foliage.

17. A base for supporting artificial flowers or foliage comprising a downwardly depending spike for pushing into a supporting medium defining an upwardly-facing threaded opening, and at least one stem-supporting member defining a plurality of stem-receiving apertures therein and defining a central aperture, and securing means having an enlarged upper body part and an elongate threaded rod which is received within the threaded opening, the spike passing through the central aperture in the or each stem-supporting member to hold the or each stem-supporting member therebetween, and wherein said upper body part of said securing means being formed integrally with a lower portion of one or more stems of an artificial flower or artificial foliage.

18. A base for supporting artificial flowers or foliage comprising a single spike pushable into a supporting medium for supporting the base, and a plurality of stem-supporting members securable on said spike and defining a plurality of stem-receiving apertures therein, said plural stem supporting members being arranged on top of each other in order of upwardly-decreasing diameter.

19. A base in accordance with claim 18, wherein the plural stem-supporting members each define a central recessed region in which the adjacent supporting member of smaller diameter is able to sit.

* * * * *